(12) United States Patent
Ikegami et al.

(10) Patent No.: US 6,288,174 B1
(45) Date of Patent: Sep. 11, 2001

(54) POWDERY MATERIAL AND MODIFIER FOR CEMENTITIOUS MATERIAL

(75) Inventors: Yukihiro Ikegami; Toshihiro Kasai, both of Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 08/981,806

(22) PCT Filed: Jul. 4, 1996

(86) PCT No.: PCT/JP96/01855

§ 371 Date: Feb. 16, 1999

§ 102(e) Date: Feb. 16, 1999

(87) PCT Pub. No.: WO97/03112

PCT Pub. Date: Jan. 30, 1997

(30) Foreign Application Priority Data

Jul. 7, 1995 (JP) .................................... 7-172526
Feb. 6, 1996 (JP) .................................... 8-042206

(51) Int. Cl.[7] .................................................. C08F 265/02
(52) U.S. Cl. ........................................... 525/301; 523/201
(58) Field of Search ............................. 525/301; 523/201

(56) References Cited

U.S. PATENT DOCUMENTS

| 4,916,171 | 4/1990 | Brown et al. . | |
|---|---|---|---|
| 5,198,500 | 3/1993 | Muramoto et al. . | |
| 5,206,299 | * 4/1993 | Oshima | 525/305 |
| 5,290,857 | * 3/1994 | Ashida | 525/65 |
| 5,686,509 | * 11/1997 | Nakayama | 523/201 |
| 5,712,346 | * 1/1998 | Lee | 525/288 |

FOREIGN PATENT DOCUMENTS

| 0510805 | 10/1992 | (EP) . |
|---|---|---|
| 2-129266 | 5/1990 | (JP) . |
| 3-210336 | 9/1991 | (JP) . |
| 5-112655 | 5/1993 | (JP) . |
| 5-140325 | 6/1993 | (JP) . |
| 6-179754 | 6/1994 | (JP) . |

* cited by examiner

*Primary Examiner*—Paul R. Michl
(74) *Attorney, Agent, or Firm*—Finnegan, Henderson, Farabow, Garrett & Dunner L.L.P.

(57) ABSTRACT

An acrylic polymer powdery material, which is a particularly useful powdery material as a modifier for cementitious material, comprising fine particles of a core-shell structure comprising a core polymer being comprised of an acrylic polymer having a glass transition temperature (Tg) of −20−+15° C., a weight average molecular weight of 100000–2000000, an acid value of 25 mg KOH/g or less and a shell polymer being comprised of an acrylic polymer having a Tg of 50–90° C., a weight average molecular weight of 100000–2000000, an acid value of 30–130 mg KOH/g, wherein the weight ratio of the core polymer and shell polymer is 30/70–80/20 (% by weight).

16 Claims, No Drawings

POWDERY MATERIAL AND MODIFIER FOR CEMENTITIOUS MATERIAL

TECHNICAL FIELD

The powdery material of this invention is a core-shell structured powder comprising a core polymer and a shell polymer, and is particularly effective when used as a modifier for cementitious material.

BACKGROUND TECHNOLOGY

Cement compositions (hereafter "cement milks") have been mixed with cement modifying resin materials as cement modifiers, such as natural rubber, styrene-butadiene latex, acrylonitrile-butadiene latex, chloroprene latex, and the like, and have been in commercial use to improve the strength or the like of the concrete products obtained from such cement milks.

These cement modifiers are roughly classified into aqueous emulsion-type materials (hereafter "emulsion type cement modifiers"), and resin powdery materials (hereafter "powdery material type cement modifiers").

These cement modifiers are required to have the following basic properties:
1) Good mixing and dispersion stability when the cement modifier is stirred and mixed with cementitious material;
2) Minimal change in viscosity when incorporated into a cement milk, with a good workability;
3) Substantial improvement effect on physical properties such as the strength of the concrete products obtained by hardening the cement milk, such as surface hardness, compression strength, and flexural strength (hereafter, "strength"), and adhesion to a variety of substrates (hereafter "adhesion").

The extent of such improvement in strength, adhesion, and the like, of concrete products is, in general, said to depend on the glass transition temperature (hereafter "Tg") of the cement modifier and its minimum film forming temperature (hereafter "MFT").

Definition: The MFT is the temperature at or above which the polymer emulsion forms a continuous film. MFT is based on an apparatus based on the temperature gradient method described by Protzman and Brown (J. Appl. Polymer Sci 4, (1960)).

Apparatus for Measurement: An emulsion is filled into grooves, 15 mm wide, about 1 mm deep, and 400 mm long on a thick aluminum slab where a temperature gradient is maintained usually 20–80° C., and is left standing for several hours. The aluminum slab has thermocouples embedded at about 25 mm intervals apart; as the water is allowed to gradually evaporate, a continuous film (or continuous films) begins to form starting from the high temperature end. The temperature at which a clear continuous film becomes discontinuous (formation of cracks and transportation into white powdery state) is recorded as the MFT.

A cement milk which uses an emulsion type cement modifier containing a high Tg polymer as an emulsion type cement modifier has a high MFT and requires a high temperature for hardening into a concrete product; in particular, when one casts during winter periods at temperatures lower than the MFT of the cement milk, a continuous film cannot be formed efficiently when a concrete article is made, hence, not only is it difficult to produce a concrete product retaining excellent strength, but there are sometimes adverse effects on the concrete products in other areas such as resistance to water, weathering resistance, resistance to acid, and the like (hereafter summarily called "durability") or in poor trowelability.

Consequently, it has heretofore been customary to improve the strength and adhesion of a concrete product by producing it from a cement milk containing an emulsion type cement modifier having a lower Tg polymer or a lower MFT.

From among these cement modifiers, powdery type cement modifiers are superior to emulsion type cement modifiers in that (1) their transport is easier in that it is not necessary to transport water as in the case of the emulsion type modifiers and they can be transported in bags, simplifying packaging; (2) they are easier to handle in that they do not suffer from freezing or phase separation as with the emulsion type modifier; (3) they give good workability and provide concrete products with no performance variations since a cement milk can be prepared by transporting a cement mixture obtained by premixing cementitious material with a cement modifier and simply adding water to the cement mixture at the work site to produce the cement milk.

However, a cement milk mixed with a powdery material obtained from a spray dried emulsion having a low Tg or low MFT as described above, if cast and hardened into a concrete product at low temperatures such as in a casting application in winter periods, cannot realize strength and adhesion at satisfactory levels; thus, low temperature-usable powdery material type cement modifiers have not yet been discovered.

Powdery type cement modifiers have been proposed, for example, a powdered cement modifier as described in U.S. Pat. No. 4,916,171, which is a spray dried powder of an emulsion containing core-shell structured acrylic polymer particles comprising a core polymer composed of an alkali insoluble emulsion polymer and a shell polymer composed of an alkali soluble emulsion polymer, part of which has been alkaline-neutralized.

The polymer which constitutes the shell of the core-shell structured acrylic polymer particles disclosed in U.S. Pat. No. 4,916,171 has a Tg of 100° C. or higher and has a high acid value by virtue of having a large amount of MAA, as high as 20–50% by weight, copolymerized therein, where the polymer is neutralized to 80% or higher and has a molecular weight of 5000–50000 so as to achieve the dispersion stability of the polymer particles in the aqueous emulsion. However this product has been deficient in that the polymer constituting the shell of said polymer particles has the low molecular weight of 5000–50000, resulting in a concrete product which, after a cement milk containing such a polymer is hardened, is poor in durability, particularly in resistance to water, weathering resistance, and resistance to acid; production of polymer particles by spray drying such an emulsion using a spray drying process generates polymer particles which tend to block, whereby the blocked [caked] polymer particles are poor in friability, making them extremely difficult to handle.

In addressing these problems, U.S. Pat. No. 4,916,171 discloses a method of adding an anti-blocking agent such as inorganic particles like fine silica particles to the emulsion and spray drying, thereby attempting to prevent the resultant polymer particles from blocking, but polymer particles obtained by such a method end up containing a large amount of inorganic particles in the polymer particles, failing to fully exert advantageous properties as a cement modifier.

Polymer particles having such a high-acid-value shell polymer used as a cement modifier in a cement milk, will cause the viscosity to increase to a high level, reducing casting workability; in addition, concrete products obtained by hardening such a cement milk do not exhibit sufficient improvements in durability, strength, adhesion, and the like, so that such a polymer will not make a satisfactory cement modifier.

In addition, the polymer which constitutes the shell of these polymer particles a Tg as high as 100° C. or higher so that a cement milk to which have been added said polymer particles of a high Tg shell polymer will show a high MFT, thereby showing inferior curing behavior and failing to provide the resultant concrete product with properties such as satisfactory durability, strength, adhesion, or the like, where such shortcomings are aggravated among other deficiencies when concrete products are produced, particularly at low temperatures as in winter.

DISCLOSURE OF THE INVENTION

The present inventors intensively studied a way to overcome the deficiencies of acrylic polymer particles having such prior art core-shell structures, and as a result, discovered that a powdery acrylic polymer material capable of solving the above problems can be obtained by using core-shell structured fine particles having as a shell polymer an acrylic polymer with Tg 50–90° C., a weight average molecular weight of 100000–2000000, and an acid value of 30–130 mg KOH/g; and thus have completed this invention.

That is, the powdery material of this invention comprises fine acrylic polymer particles of a core-shell structure comprising a core polymer comprising an acrylic polymer having a Tg of −20–+15° C., a weight average molecular weight of 100000–2000000, and an acid value of not higher than 25 mg KOH/g and a shell polymer of an acrylic polymer having a Tg of 50–90° C., a weight average molecular weight of 100000–2000000, and an acid value of 30–130 mg KOH/g, wherein the volume average particle size thereof (hereafter simply "average particle size")is 200–700 nm and the core polymer to shell polymer ratio by weight is 30/70–80/20 (% by weight).

In addition, the present invention embodies a modifier for cementitious material obtained by mixing a powdery material comprising the above-mentioned core-shell structured fine particles.

BEST EMBODIMENT FOR CARRYING OUT THE INVENTION

The powdery material of this invention and the process for manufacture thereof will be specifically described below.
[Powdery Material]

The present invention is directed to a powdery material having a core-shell structure of the aforementioned makeup and a modifier in which said acrylic powdery material is mixed with cementitious material.

The powdery material of this invention is obtained by drying by means of spray drying an a emulsion of fine particles of a core-shell structure made up of a core of a specific core polymer and of a shell of a specific shell polymer.

The powdery material of this invention, by virtue of the above mentioned core-shell structure makeup, provides good film forming properties at low temperatures for a cement milk added to cementitious material, which on hardening gives a concrete product having excellent durability, strength, and adhesion.

Specifically, for the shell polymer which constitutes the powdery material of a core-shell structure of this invention, raising its weight average molecular weight enables one to provide anti-blocking capability when an emulsion in which the fine particles of the core-shell structure are dispersed is converted to a powdery material, as well as anti-blocking capability when said powdery material is stored for a long period of time; at the same time it provides improved durability to the concrete product obtained therefrom. With the Tg being in the range of 50–90° C. and the acid value being in the range of 30–130 mg KOH/g for the shell polymer, it can provide a powdery product that can realize a low MFT, with the MFT being at 25° C. or lower, and that has a suitable alkaline solubility, so that a cement milk to which this powdery material is added will have a low viscosity and good casting workability, thereby enabling a hardened concrete product to be provided with excellent durability and strength.

In addition, the core polymer which constitutes the powdery material of this invention of a core-shell structure is controlled to have its acid value to be within a specific range so as to maintain the dispersion stability of the powdery material in an aqueous alkali solution and to ensure good film forming capability for a cement milk containing said powdery material at low temperatures, particularly at 20° C. or lower, by optimizing its Tg; in addition, raising its weight average molecular weight provides the concrete product obtained by hardening the cement milk to which the powdery material is added with excellent durability and strength.

It is particularly important for this invention to use as a shell polymer an acrylic polymer having a Tg of 50–90° C., weight average molecular weight of 100000–2000000, and an acid value of 30–130 mg KOH/g.

This is because if the shell polymer has a Tg less than 50° C., the powdery material will undergo blocking to itself when the powdery material is manufactured by spray drying the emulsion containing fine particles with a core-shell structure, which will considerably decrease the powdery material production workability and productivity, and at the same time that will produce a powdery material having inferior anti-blocking properties when stored over a long period of time. On the other hand, a cement milk containing a powdery material with a shell having a Tg exceeding 90° C. will have a high MFT, producing a concrete product with reduced strength, particularly in flexural strength and compressive strength. Thus, such cement milk will have a substantial drop in these properties, particularly when cast at low temperatures as in winter periods. The shell polymer should preferably have a Tg of 50–90° C., more particularly 55–80° C.

A shell polymer with a weight average molecular weight less than 100000 will cause the concrete product obtained from a cement milk containing such core-shell polymer powdery material to have reduced durability; in particular, that concrete product will have substantially decreased durability if such a cement milk is cast at low temperatures.

In contrast, a core-shell type polymer powdery material having a weight average molecular weight exceeding 2000000 is not preferred because it will have an extremely low solubility in aqueous alkali solution and the cement milk containing such a powdery material will have too high an MFT and at the same time a substantial increase in viscosity, reducing casting workability. The weight average molecular weight of the shell polymer should be in the range of 100000–2000000, preferably 300000–1.5 million.

The acid value of the shell polymer should be in the range of 30–130 mg KOH/g if it is aimed to reduce the viscosity of the cement milk containing the powdery material of this invention, to reduce the MFT, and to strike a good balance in properties such as the durability and strength of the concrete product obtained from such a cement milk. A powdery material having an acid value less than 30 mg KOH/g will have a shell with a low alkali solubility so that the core-shell type polymer powdery material in an aqueous alkali solution will have poor dispersion stability, failing to sufficiently reduce the MFT of the cement milk containing the powdery material, thereby resulting in inferior casting workability.

On the other hand, a core-shell type polymer powdery material having a shell with its acid value exceeding 130 mg KOH/g will have a high solubility in aqueous alkali solution so that the cement milk containing such polymeric powder will considerably increase its viscosity, thereby lowering casting workability, in addition, providing the concrete product with reduced durability.

The shell polymer should have an acid value in the range of 30–130 mg KOH/g, preferably 40–120 mg KOH/g.

The shell-polymer that constitutes the powdery material of this invention, preferably comprises 70–95% by weight of at least one vinyl monomer (b-1) selected from alkyl (meth) acrylate, styrene, vinyl chloride, and vinyl acetate and 5–30% by weight of an unsaturated carboxylic acid (b-2).

For the alkyl (meth)acrylate and the unsaturated carboxylic acid (b-2) used as a (b-1) vinyl monomer which constitutes the shell polymer one may use the same type of monomer used in the core polymer to be described later. The core polymer of this invention comprises an acrylic polymer having its Tg in the range of −20–+15° C. weight average molecular weight of 1000000–2000000, and an acid value of 25 mg KOH/g from the standpoints of stably dispersing the powdery material of this invention in aqueous alkali, without being dissolved and of ensuring the film-forming capability of a cement containing the powder material of this invention at 20° C. or lower, and of improving the durability and strength of the concrete product to be obtained therefrom.

The core polymer should have average Tg's in the range of −20–+15° C. in order to improve the film forming capability of an emulsion containing the powdery material of this invention, particularly so as to reduce its MFT at low temperatures.

Setting the Tg of the core polymer to be at +15° C. or lower can reduce the MFT of the cement milk containing the powdery material of this invention to 20° C. or lower, which can then provide good workability even at low temperatures such as in winter castings, at the same time, enabling one to produce a concrete with good durability and strength and free from crack formation or the like.

Setting the Tg of the core polymer to −20° C. or higher can provide a powdery material with excellent anti-blocking properties both during spray drying an emulsion containing fine particles with a core-shell structure resulting from emulsion polymerization and during its long storage time.

The core polymer preferably has its weight average molecular weight in the range of 100000–2000000 so as to improve the properties of the concrete product obtained from a cement milk containing the powdery material of this invention, particularly for improved durability at low temperatures such as resistance to water, weathering resistance, resistance to acid, and the like.

In addition, it is preferred for the acid value of the core polymer to be in a range not more than 25 mg KOH/g for reducing the solubility of the powder in the cement milk, to which the powder of this invention is added, and at the same time suppressing the increase in viscosity of the cement milk, thereby providing good workability.

The core polymer of this invention comprises an acrylic polymer obtained by polymerizing a monomer mixture of 90–100% by weight of at least one vinyl monomer (a-1), selected from alkyl (meth) acrylates, styrene, vinyl chloride, and vinyl acetate, 0–5% by weight of an unsaturated carboxylic acid (a-2), and 0–5% by weight of one other copolymerizable monomer (a-3).

The alkyl (meth) acrylate used as a vinyl monomer (a-1) which makes up the core polymer includes, for example, methyl (meth) acrylate, ethyl (meth) acrylate, butyl (meth) acrylate, and the like; the unsaturated carboxylic acid (a-2), for example, includes methacrylic acid, acrylic acid, itaconic acid, and the like; and the other copolymerizable monomer (a-3) includes, for example, 2-hydroxyethyl methacrylate, 2-hydroxyethyl acrylate, 2-hydroxypropyl methacrylate, 2-hydroxypropyl acrylate, and the like.

The weight ratio of the core polymer to the shell polymer which make up the fine particles of the core-shell structure of this invention is preferably in the range of core polymer/shell polymer (% by weight)=30/70–80/20, preferably in the range of 30/70–70/30.

A shell polymer in the fine particles in an amount less than 20% by weight will fail to sufficiently cover the low Tg core polymer, which makes it difficult to obtain fine particles with a complete core-shell structure so that an emulsion containing such fine particles will tend to block at the time of spray drying or during a long term storage of the powdery material, in addition, the blocked powdery material will tend to be inferior in friability.

Fine particles with a core shell structure with the shell polymer content exceeding 60% by weight will have increased solubility in aqueous alkali solution of the powdery material of this invention so that the cement milk containing such powdery material will exhibit the behavior of rapidly increasing viscosity, thereby tending to have reduced casting workability.

The powdery material of this invention should have 5–70%, preferably 10–60%, more particularly 20–60%, of the total carboxyl groups in the fine particles of a core-shell structure neutralized.

An emulsion containing fine particles of a core-shell structure with such a high degree of neutralization will exhibit a good spray state at the time of spray drying, thereby further improving blocking resistance during the spray drying and during the long-term storage of the resultant powdery material. Addition of such a powdery material to an aqueous alkali solution will cause even secondary aggregates, which are aggregates of primary particles, to show good friability and further improve dispersion stability.

A cement milk containing a powdery material comprising partially neutralized fine particles of this invention can not only impart the goal properties of this invention such as durability, strength, and the like, but it can also show improved workability such as in trowelling and the like, and also can improve the adhesion of the concrete product prepared from the cement milk to a variety of substrates.

A powdery material comprising a polymer with a degree of neutralization less than 5% sometimes may show reduced dispersion stability in an aqueous alkali solution. In order to improve workability such as the trowelling of a cement milk containing the powdery material as well as the durability and strength of the resultant concrete product, the degree of neutralization of the polymer particles, which make up the powdery material, is preferably 5% or higher. Said powdery material obtained from an emulsion containing a powdery material of a polymer having a degree of neutralization higher than 70% tends to swell in an aqueous alkali solution or in a cement milk, or to gel to form an aggregate, so that the degree of neutralization should be not more than 70%.

The emulsion containing the powdery material of this invention will have a low MFT and the cement milk containing this powdery material will show improved low temperature hardening capability.

When a cement milk having such properties is cast, the formation of a resin coated film on the surface of the cement milk will prevent water from evaporating so as to be able to contribute to a sufficient cure, (that is, a hydration reaction) at the surface layer of the concrete product, and also will form resin coated films between the components of the cementitious material, whereby one can obtain an outstanding concrete product in terms of overall strength such as surface hardness, flexural strength, compressive strength, and the like.

The emulsion obtained by dispersing the powdery material of this invention in an aqueous alkali solution has an MFT not higher than 20° C., preferably not higher than 5° C. so that the cement milk containing said polymer fine particles will undergo a good hydration reaction of the cementitious material, thereby one can obtain a concrete product with further improvement in strength and durability.

[Process of Manufacturing Powdery Material]

There are two methods for the production of fine particles of a core-shell structure that constitute the powdery material of this invention.

One is a process called a seed emulsion polymerization process which comprises preparing a monomer mixture for a core formation, carrying out an emulsion polymerization to produce an emulsion containing the core polymer, preparing a shell-forming monomer mixture, adding this mixture to the first emulsion, and carrying out an emulsion polymerization, yielding the shell component.

The other is a process of generating polymer particles of a core-shell structure, which comprises first preparing a monomer mixture for generating the shell, emulsion polymerizing this to produce an emulsion containing the shell polymer, preparing a monomer mixture for producing the core and adding the mixture to the first emulsion, and carrying out a phase transition polymerization.

In particular, the above seed emulsion polymerization method is preferred in the manufacture of fine particles of a core-shell structure of this invention in that one can increase the molecular weight of the shell polymer, which can improve the durability such as resistance to water, weathering resistance, resistance to acid, and the like, of the concrete product that can be obtained from a cement milk containing this powdery material.

For use of the powdery material of this invention as a modifier for cementitious material, it is particularly preferred to manufacture the powdery material in the following manner using a seed emulsion polymerization process:

A monomer mixture for the generation of a core polymer is prepared which comprises 90–100% by weight of at least one vinyl monomer (a-1) selected from alkyl (meth) acrylates, styrene, vinyl chloride, and vinyl acetate, 0–5% by weight of an unsaturated carboxylic acid (a-2), and 0–5% by weight of a hydroxyl-group-containing (meth) acrylate , with the total amounting to 100% by weight, followed by emulsion polymerization to generate an emulsion in which the core polymer which becomes the seed particles is dispersed.

Then a monomer mixture for the formation of the shell polymer is prepared which comprises 70–95% by weight of at least one vinyl monomer (b-1) selected from alkyl (meth) acrylates, styrene, vinyl chloride, and vinyl acetate, and 5–30% by weight of an unsaturated carboxylic acid (b-2), with the total amounting to 100% by weight; the mixture is sequentially added dropwise, to the emulsion containing the above core polymer, followed by carrying out an emulsion polymerization using the seed particles as nuclei thereby generating a shell polymer to produce an emulsion containing fine polymer particles with a core-shell structure.

The fine polymer particles of a core shell structure referred to here are present in the emulsion in a state of primary particles with an average particle size being about 200–700 nm; if the average particle size of this core-shell structured fine particle is smaller than 200 nm, the particle surface area per unit volume will be higher, resulting in an insufficient thickness of the shell polymer layer and tending to fail to sufficiently impart anti-blocking properties during spray drying and during storage; in addition, the result would be a smaller amount of core polymer per particle so that these fine particles would tend to be unable to impart satisfactory durability and strength as a modifier to the cementitious material. If the average particle size is greater than 700 nm, the emulsion as such will have poor stability, and at the same time the layer of the shell polymer contained in the primary particle will be too thick to fully make use of the effect of the component which imparts lower MFT and lower viscosity, contained in the core polymer in the fine particles, so that such emulsion will tend to give a powdery material that cannot satisfactorily meet the goal performance of this invention.

The resultant emulsion as above, on spray drying, gives the powdery material of this invention.

The method of spray drying the emulsion containing fine particles of a core-shell structure is not particularly limited and any conventional spray dryer can be used; the preferred temperature conditions for the spray drying should be so selected to increase the difference in temperature between the emulsion spray inlet of the spray dryer and the powdery material outlet, which will result in good drying efficiency for the emulsion resin.

To produce fine particles of a partially neutralized core-shell structure, the emulsion containing fine particles in the core-shell structure prepared as above should be neutralized for as much as 5–70% of the total carboxyl groups in said particles by adding alkali, followed by drying via a spray drying process.

There are no particular limitations as to the alkali types used in neutralization; one can use alkali metal hydroxides of potassium, sodium, magnesium, calcium, aluminum, and the like, organic amines such as ethyl amine, ethanolamine, diethyl amine, pyrrolidine, triethyl amine, and the like, ammonia, and the like.

Spray drying the above emulsion will give a powdery material with an average particle size of about 5–100 $\mu$m comprising secondary particles resulting from lightly aggregated primary particles. The powdery material of this invention refers to primary particles within the above particle size range or to particles in a mixed state of primary particles with secondary aggregates with good friability.

The term "friability" referred to in this invention is evaluated in terms of the percentage extent of crumbling exhibited by a powdery material in a blocking test performed under the following conditions:

[Powdery Material Blocking Test]

A 20 g sample is packed into a cylinder with a 54 mm diameter, to which sample is applied a 5 kg weight to be left standing for 2 hours at 50° C. to produce a blocked product. Then the blocked product is placed on a sieve with a 1 mm-mesh opening and is electromagnetically vibrated to crumble for 20 seconds, thereby measuring the amount of the sample falling through the sieve.

$$\text{Sample's friability \%} = \frac{\text{The amount of sample crumbled and falling through the sieve (g)}}{\text{The total amount of sample placed on the sieve (20 g)}} \times 100$$

The powdery material of this invention should have this friability being not less than 20%, preferably not less than 50%, more particularly about 80%.

A product with friability of not more than 50% will cause the powder to exhibit poor dispersion stability in aqueous alkaline solution; and when such a powder is used as a modifier for cementitious material, this will tend to make the various performance features poorer than those of concrete products using no such cement modifier.

The powdery material of this invention exhibits excellent anti-blocking properties because the shell polymer constituting the fine particles of the core shell structure has a high weight average molecular weight of 100000–2000000 and exists in a state of primary particles having the above average particle size or in a state of a light degree of secondary aggregation of those primary particles so that the powdery material, when dispersed in an aqueous alkali solution or the like, is readily dispersed to a state close to that of the primary particles, thereby fully realizing its characteristics as fine particles of a core-shell structure.

Another feature of the powdery material of this invention is that optimizing the shell polymer's Tg, acid value, and weight average molecular weight provides very good anti-blocking properties when the emulsion polymerized solution containing polymer particles of a core shell structure are spray dried into a powdery material, no longer requiring an anti-blocking agent such as an inorganic powdery material or the like.

Therefore, the resultant powdery material is free from any effect due to the use of anti-blocking agents, free from the poor dispersion in the emulsion polymerized solution of core-shell type polymer particles due to the anti-blocking agents such as inorganic powdery material or the like when blended into cementitious material, or free from any delay in hardening or any depression in strength of the cement milk, thereby producing a concrete product with excellent durability, strength, and clarity as well as a good surface state.

When the powdery material of this invention is used as a modifier for cementitious material, the applicable cementitious material is not particularly limited to any types, including regular hardening Portland cement, as well as rapid hardening Portland cement, ultra rapid hardening Portland cement, and the like.

The cement milk containing the powdery material of this invention can be used in a variety of applications with no limitations, for use of trowels, base-coats, semi-flexible pavements, or other special applications regardless of cement milk viscosities, from low to high viscosities.

EXAMPLES

Hereafter, with reference to working examples, this invention aisexplained. In these examples, "parts" are "parts by weight"; percentages(%) in these examples are based on % by weight.

The test items of the powdery material of this invention were measured by the following methods.

[Acid Value]

The amount of KOH in mg needed for neutralizing 1 g of a powdery material (mg KOH/g).

[Conditions Under which Emulsion is Spray Dried]

The conditions under which the powder was sprayed from the atomizer outlet was visually inspected.

○: Free of any fused powdery material, with uniform emulsion spray drying

X: Accumulation of fused powdery product, with uneven emulsion spray drying

[Anti-blocking Properties]

The state of the powdery material obtained by spray drying an emulsion was observed under an electron microscope (Nippon Denshi KK: trade name JSM-5200)

○: A free-flowing powder devoid of any secondary aggregated powder crumbs reaching 1 mm or greater in diameter X: A non-free-flowing powdery material with secondary aggregated powder crumbs of 1 mm or greater in diameter

[Dispersion Stability]

An aqueous alkali solution adjusted to pH 12 by adding 28% aqueous ammonia to 90 parts of pure water was stirred (150 rpm) by a "homodisper" to which 10 parts of a powdery material was added and the mixture was stirred for 5 minutes to obtain an emulsion, and the way the powder was dispersed in the emulsion was visually observed.

○: The powder was uniformly dispersed and milky white in the aqueous alkali solution, free of any aggregates or precipitates.

Δ: Aggregates and precipitates were observed

X: The powder was partially dissolved in aqueous alkali and showed the behavior of increased emulsion viscosity.

[Resistance to Water]

10 parts of a powdery material was mixed with aqueous alkali solution which had been adjusted to pH 12 by adding 28% aqueous ammonia to 90 parts of pure water to generate an emulsion; and the emulsion was then cast onto plate glass followed by drying and film forming; and the resultant film was soaked 24 hours in water to visually observe the change in the state of the film by visual inspection.

○: Not dissolved, with essentially no change

Δ: Not dissolved, but with whitening and swelling

X: The film became brittle and was peeled off and/or dissolved and peeled off.

[Resistance to Acid]

10 parts of a powdery material was converted into a film by the above casting method and the resultant film was then soaked 24 hours in 5% aqueous hydrochloric acid solution to visually observe the state of said coated film.

○: Essentially no change

X: The film became brittle, and was peeled off or dissolved and peeled off.

[Cement Blend Composition A: for Semi-flexible Pavement]

A cement milk was prepared from a ultra rapid hardening Portland cement/regular Portland cement/gravel powder/powdery material/water=120 parts/730 parts/80 parts/34 parts/550 parts.

[Cement Blend Composition B: for Trowelling]

A mortar was prepared from Portland cement/sand (Toyoura Standard Sand)/powdery material/water=100 parts/300 parts/10 parts/70 parts±α parts. The Toyoura Standard Sand is the product obtained by removing foreign objects from natural silicate sand produced in Toyoura Cho, Yamaguchi-ken, Japan, and adjusted to a particle size which would give not more than 1% residue remaining on a standard 300 μm screen sieve with at least 95% remaining on a standard 100 μm screen sieve.

[Cement Milk Viscosity]

Cement blend composition A and cement blend composition B were tested by placing each cement milk in a P funnel and measuring the time for the milk to flow out, to be used as a measure of viscosity.

○: At least 10.0 seconds, but less than 11.0 seconds

Δ: At least 11.0 seconds, but less than 12.0 seconds

X: At least 12.0 seconds

[Surface Hardness]

The cement milk of cement blend composition A prepared as above, was poured into 4 cm×4 cm×16 cm mold, cured for 1 week in a constant temperature, constant humidity bath set to a humidity of 80%, removed from the mold, and the surface was scratched with a metal spatula to evaluate surface hardness.

○: the surface layer cannot be scraped off.

Δ: part of the surface layer is peeled off.

X: the surface is brittle and can be easily scraped off.

[Trowelability]

A mortar with a cement blend composition B prepared as above, was coated onto a flat mortar sheet to a 100 mm thickness, and the finished coating was subjected to a sensory evaluation.

○: a smooth and flat finish

Δ: somewhat sticky or flaky

X: sticky or flaky, difficult to be finished into a smooth surface.

[Flexural Strength]

The mortar of the cement blend composition B above was filled into a 4 cm×4 cm×16 cm mold and cured according to JIS A6203 conditions to give a hardened product, on which three flexural strength measurements were made using a 1 ton Tensilon to obtain an average value therefrom.

○: exceeding 45 kgf/cm$^2$

Δ: 35–45 kgf/cm$^2$

X: less than 35 kgf/cm$^2$

[Compression Strength]

The above cement blend composition B mortar was filled into a 4 cm×4 cm×16 cm mold, and cured according to JIS A6203 conditions to give a hardened product, which was measured 3 times using a mortar compression test machine by means of a 60 ton Tensilon and the average values were obtained.

○: exceeding 110 kgf/cm$^2$

Δ: 90–110 kgf/cm$^2$

X: less than 90 kgf/cm$^2$

[Adhesion Strength]

The above cement blend composition B mortar was applied with a trowel onto a flat mortar sheet to 10 mm thickness and hardened according to JIS A6203 conditions to give a hardened product; adhesion strength was measured 3 times using a 1 ton Tensilon, and an average value was obtained.

○: exceeding 10 kgf/cm$^2$

Δ: 8–10 kgf/cm$^2$

X: less than 8 kgf/cm$^2$

Example 1

A 2 l four-necked flask was charged with 925 parts of pure water, 12.5 parts of polyoxyethylene nonylphenyl ether (manufactured by Kao KK; trade name Emarugen 910), and 0.75 parts of potassium persulfate, sparged with nitrogen gas, stirred under a nitrogen gas stream at 130 rpm, and heated to 70° C.

Then a mixture of 125 parts of methyl methacrylate, 125 parts of butyl acrylate, and 5.0 parts of polyoxyethylene nonylphenyl ether (manufactured by Kao KK; trade name Emarugen 905) was added dropwise to the above flask in 3 hours, and the mixture was held at 70° C. for 1 hour. Then a mixture of 135 parts of methyl methacrylate, 65 parts of butyl acrylate, 50 parts of methacrylic acid, and 5.0 parts of sodium dialkyl sulfosuccinate (manufactured by Kao KK; trade name Perex OTP [phonetic translation]) was added dropwise to the above flask over 2 hours.

The mixture was held 1 hour at 70° C. and then heated to 80° C. and was held 1 hour at the temperature to complete the polymerization to give a milky white emulsion polymer (% solids, 36.2%; weight average molecular weight, 800000).

The resultant emulsion polymer was spray dried using a spray dryer (manufactured by Ohkawara Kakoki; trade name L-8 Model) set at a chamber inlet temperature of 130° C. and chamber outlet temperature of 70° C. with the number of the atomizer revolutions at 30000 rpm to give a powdery product.

The state of spraying was good and there was no adhesion of the emulsion polymer and/or its spray dried powdery product to the inner walls of the chamber and transport tube.

The resultant powdery material had a core polymer with a Tg (calculated value) of 11° C., a shell polymer with a Tg (calculated value) of 59° C., an average particle size of 26 μm, and a water content of 1.1%; no blocking of the powdery material to itself was observed at all.

An observation of the powdery product under an electron microscope indicated a secondary aggregate of primary particles of an average particle size of 1 μm or less, forming powders of about 26 μm in average particle size.

10 parts of the resultant powdery material was placed in aqueous ammonia with the pH adjusted to 12 by adding 28% aqueous ammonia to 90 parts of water to form an emulsion, which showed a good dispersion stability of the powdery material, and the emulsion had an MFT of not higher than 5° C.

The resultant powdery product obtained by the method described above was used as a modifier for a cementitious material by uniformly mixing 3 parts of the powdery material with 100 parts of Portland cement, adding 55 parts of pure water, and well mixing to prepare a cement milk. The cement milk had a viscosity in terms of flow time of 10.4 seconds, as measured according to the above evaluation method.

The cement milk was then cured for 1 week under the above conditions to evaluate its surface hardness, which showed a good hardened state with no part of the surface layer of the concrete product having been scrapped off.

Examples 2–5 and Comparative Examples 1–10

Emulsions containing fine particles with a variety of core-shell structures were prepared using the compositions given in Table 1 and the same procedure as that of Example 1, followed by spray drying in a manner similar to that of Example 1 to obtain powdery materials.

Various evaluations of the resultant powdery materials are given in Table 1.

However, the powdery materials obtained in Comparative Examples 1, 5, 12, and 15 failed to give powdery products because the fused emulsion polymer accumulated at the atomizer opening during spray drying. Therefore, the resultant powders could not be evaluated for their dispersion stability, the viscosity of the emulsions containing such powdery material, the MFT of said emulsions, the viscosity of the emulsion obtained by blending the resultant powder with cementitious material, or the resistance to water, resistance to acid, and surface hardness of concrete products obtained by curing such emulsions.

Examples of this invention and comparative examples are each described below.

Examples 1–3 showed no blocking of the powdery material to itself, had good dispersion stability, and gave powdery materials with an MFT of 5° C. or less. These were blended with a blend composition given in Table 1 to obtain concrete products which gave good surface hardness when hardened both at 25° C. (Example 1) and at 5° C. (Example 2).

Example 3 is a case of blending, at a different weight ratio (P/C) of the powdery material/cementitious material, which gave products with good states.

Examples 4 and 5 and Comparative Examples 1 and 2 are those of changing the weight ratios of the core-shell of the powdery materials.

Examples 4–5 showed no blocking of the powdery materials, gave good dispersion stability, and yielded powdery products with an MFT of 5° C. When these were used to prepare cement milks with the blend composition given in Table 1 to generate concrete products, they gave good concrete products whether hardened at 25° C. (Example 4) or 5° C. (Example 5).

Comparative Examples 1 and 2 are those of changing the weight ratios of the core polymer/shell polymer.

Comparative Example 1 failed to produce a powdery material product because the ratio of the shell polymer was too law which resulted in a complete blocking during spray drying.

Comparative Example 2 is a case in which the ratio of the shell polymer was instead increased. In this case, no blocking of the resultant powdery material to itself was observed and it had a good re-dispersion capability, but the too high a ratio in the high-acid-value resin caused a considerable increase in viscosity when blended into a cementitious material.

Examples 6 and Comparative Examples 6 and 7 are examples in which the acid value of the shell polymer was varied. Example 6 is a case where the acid value of the shell polymer was 90 mg KOH/g. It had an MFT 5° C., which exhibited a good hardened state when made into a concrete product at 25° C.

Comparative Example 6 is one in which the acid value of the shell polymer was further reduced to 12 mg KOH/g. In this case, the shell polymer lost alkali solubility and the MFT did not decrease. Therefore, this means a poor hardened state would result under hardening conditions at 25° C.

Comparative Example 7 is one in which the acid value of the shell polymer was raised to 200 mg KOH/g. In this case, an emulsion containing the resultant powdery material had a drop in the MFT, but showed a considerable increase in viscosity when dissolved in alkali.

Examples 7, 8, and Comparative Example 10 and 11 are those in which the weight average molecular weight of the core polymer was varied.

Examples 7 and 8 gave MFTs at 5° C. and gave cement milks with good properties and concrete products obtained by hardening the same gave good performance.

However, Comparative Examples 10 is one for reducing the weight average molecular weight of the core polymer, where the powdery product obtained did not block and gave an emulsion containing it with a decreased MFT, but the coated film obtained from the emulsion showed poor resistance to water and poor surface hardness.

Comparative Example 11 is one in which the weight average molecular weight of the shell polymer was increased, where the shell polymer had insufficient alkali solubility, and can no longer reduce the MFT of an emulsion containing this powdery material.

Examples 9–12 and Comparative Examples 3–5, 12, and 15–17 are those of core polymers and shell polymers with different Tg's.

Comparative Examples 3–4 are cases in which the core polymers have higher Tg's. In these cases, no blocking of the powdery material to itself are observed, but emulsions containing the resultant powdery materials end up with MFTs exceeding 20° C. Good hardenability is shown (Comparative Example 3) if a concrete product is obtained at 25° C., but the hardenability level is insufficient for the formation of a concrete product at 5° C., resulting in an incompletely hardened product (Comparative Example 4).

Comparative Examples 5 and 15 are those in which the Tg's of the shell polymer are decreased. In these cases, the shell polymers have Tg's which are too low, so that they block when spray dried, failing to give powdery products.

Comparative Example 16 is one where the shell Tg is raised. No blocking of the powdery material to itself is observed, but an emulsion containing the resultant powdery material has an MFT exceeding 20° C.

Comparative Example 17 is one where the shell polymer used has a high Tg, high acid value, and a low molecular weight. In this case, the state of spray drying is good, giving a powdery product with a low average particle size, but the cement milk containing the powdery material has high viscosity and has the MFT raised to 25° C., resulting in a concrete product with poor resistance to water, resistance to acid, and surface hardness.

Examples 13–15 and Comparative Examples 8 and 9 are cases in which the average molecular weight of the shell polymer was varied.

Examples 13–15 both give an MFT at 5° C., yielding cement milk products with good properties and concrete products with good properties as obtained by hardening the same.

However, Comparative Example 8 in which the weight average molecular weight of the shell polymer was decreased, gave a powdery product which did not block and gave an emulsion with decreased MFT, but generated a coated film from the emulsion which was poor in resistance to water and resistance to acid.

Comparative Example 9 is one for a shell polymer with an increased weight average molecular weight, but in this case, the shell had insufficient alkali solubility so that it could not lower the MFT of the emulsion containing such a powdery material.

It also increased the viscosity of the cement milk causing inferior workability.

Comparative Example 12 in which the core polymer had too low a Tg, undergoing a blocking with the powdery material itself.

Example 20

A 2 1 4-necked flask was charged with 925 parts of water, 12.5 parts of polyoxyethylene nonylphenyl ether (manufactured by Kao KK, Emarugen 910), and 2.25 parts of potassium persulfate, sparged with nitrogen, stirred at 130 rpm under a nitrogen gas stream, and heated to 70° C. Then a monomer mixture of 125 parts of methyl methacrylate, 125 parts of butyl acrylate, 5 parts of sodium dioctyl sulfosuccinate (manufactured by Kao KK, Perex OTP) was added dropwise [to the flask] over 2 hours and the mixture held 1 hour at 70° C. to carry out a first stage emulsion polymerization. The resultant emulsion had monodispersed particles with an average particles size of 280 nm. Then a monomer mixture of 135 parts of methyl methacrylate, 65 parts of butyl acrylate, and 50 parts of methacrylic acid was added dropwise in 2 hours, and the mixture was held 1 hour at 70° C. and then raised to 80° C., and held 1 hour at 80° C. to complete a second stage emulsion polymerization to give a milky white emulsion. The resultant emulsion with 36.2% solids was confirmed to have grown into core-shell structure particles with monodispersed particles of an average particles size of 350 nm.

Then 2500 parts of the above emulsion was placed in a 2 l 4-necked flask, stirred at room temperature at 250 rpm, to which was added dropwise 226 parts of 5% aqueous potassium hydroxide solution in 2 hours. The stirring was continued after completion of the dropwise addition, where the pH and electrical conductivity were measured over a period of time until these values no longer changed, at which time the operation was stopped and the neutralization was completed giving a milky white neutralized emulsion.

The resultant neutralized emulsion was then spray dried using a spray dryer (manufactured by Ohkawara Kakoki, L-8 Model) with the inlet temperature of the spray dryer column set at 150° C., the outlet temperature at 80° C., the number of atomizer revolutions at 30000 rpm, to form a powdery material. The state of spraying was good in this spray drying operation and there was no adhesion of the powder to the inner walls of the spray dryer column. The resultant powder with an average particle size of 26 µm and a residual water content of 1.6% did not show any blocking of the powdery material to itself at all.

The resultant powder was observed under an electron microscope to confirm that the powdery material formed had an average particle size of 26 µm by a secondary aggregation of primary particles having a particle size of not more than 1 µm.

When this powdery material was added to water, it gave a powdery material dispersed in the water having an average particle size of 0.65(, confirming that the secondary aggregated particle mass had dispersed in water, regenerating primary particles, where no particle or mass with an average particle size exceeding 1 µm resulted from secondary aggregates.

Table 2 shows the composition of the core polymers and shell polymers of the resultant powdery materials, along with their Tg, acid value, core-shell weight ratio, shell molecular weight, and degree of neutralization. The resultant powdery materials were evaluated as to their spray conditions in their manufacturing steps, their anti-blocking properties, dispersion stability, MFT, and resistance to water, as given in Table 2.

The resultant powdery materials were used as cement modifiers to be blended with cementitious material under the blend compositions given below, followed by mixing the mixture for 10 minutes in a mortar mixer to obtain a cement milk, which was then cured according to JIS A6203 to prepare concrete products.

Evaluations in the production of concrete products and evaluation of concrete products themselves were made and the results are given in Table 2.

| Cement Blend Composition A (For troweling) | |
| --- | --- |
| Regular Portland cement | 100 parts |
| Sand (Toyoura Standard Sand) | 300 parts |
| Cement modifier | 10 parts |
| Water | 70 ± α parts |
| (α is freely adjusted) | |

| Cement Blend Composition B (For semi-flexible pavement) | |
| --- | --- |
| Super fast hardening Portland cement | 120 parts |
| Regular Portland cement | 730 parts |
| Stone powder | 80 parts |
| Cement modifier | 34 parts |
| Water | 550 parts |

Examples 21–25 and Comparative Examples 18–28

Core-shell structured powdery materials were obtained under conditions given in Table 2 in a manner similar to that of Example 20. Table 2 shows the composition of the core polymer and shell polymer of the powders obtained, along with their Tg, acid value, core polymer/shell polymer weight ratio, the molecular weights of the core polymer and shell polymer and the extent of neutralization.

Table 2 also shows the results of evaluating the state of spraying in the manufacturing steps, the anti-blocking properties, dispersion stability, MFT and resistance to water, as well as the results of evaluating the steps to produce concrete products, as well as the results of evaluating concrete products.

Table 2 also shows the result of evaluating a case with no cement modifier blended in as a reference example.

Comparative Example 20, Comparative Example 24 and Comparative Example 26, because of their low shell ratios, low shell Tg's, low core Tg's, yielded fused products accumulating at the time of spray drying, which caused blocking or inability to form powder, so that any subsequent evaluations were not carried out.

Examples 20–22 and Comparative Examples 20 and 21 are cases in which the core-shell polymerization ratios were changed: Examples 20–22 caused no blocking of the powdery material, gave good dispersion stability, and showed MFTs at 5° C. or lower and gave good physical properties when blended into cementitious material, producing superior physical properties to those without the powdery material of this invention being blended in (reference examples). If the shell ratio was too low (Comparative Example 20), the coating properties of the low Tg core became insufficient, making it difficult to spray dry, and the resultant powder easily blocked; if the shell ratio was too high (Comparative Example 21), the alkali soluble shell increased, resulting in an increased viscosity when blended into cement, which seriously decreased workability.

Example 23 and Comparative Examples 18 and 19 are cases in which the extent of neutralizing carboxyl groups was changed: Example 23 produced a powdery material with no blocking and with good dispersion stability, but if the degree of neutralization was low (Comparative Example 18), there was a slight blocking tendency and it provided no improvement in trowelability and adhesion strength while a high degree of neutralization (Comparative Example 19)

gave a powdery material which swelled and exhibited decreased dispersion stability.

Examples 24 and 25 and Comparative Examples 22 and 23 are cases in which the acid value of the shell was changed: Examples 24 and 25 do not adversely affect MFT or the viscosity when blended with cementitious material, but if the acid value is too low (Comparative Example 22), such a shell decreases in alkali solubility and fails to provide a low MFT, while if the acid value is too high (Comparative Example 23), the dispersion stability drops and the viscosity of the cement milk increases, thusly workability being deteriorated.

Comparative Example 24 is a case where the weight average molecular weight of the shell is low, resulting in a powdery material with the resin itself having reduced resistance to water, while Comparative Example 27 is a case in which the core has a high Tg, which considerably increases the viscosity of the cement milk.

Comparative Example 25 is a case in which the molecular weight of the shell was reduced where the resultant cement milk could not have its MFT reduced to 5° C. or lower, but gave a concrete product with insufficient resistance to water.

Comparative Example 27 is a case in which the core had an increased Tg and gave a good spraying state, giving a powdery material, but its MFT was high at 30° C., causing the viscosity of the cement milk containing this to increase.

Comparative Example 28 is a case for a product with an elevated acid value, where the MFT of the cement milk obtained therefrom can be set to 5° C. or lower, but it gives poor adhesion in a troweling applications.

Industrial Potential Utility

As discussed above, the powdery material of this invention is useful as a modifier for cementitious material.

TABLE 1

(Examples for systems with no alkaline neutralization)

| | Composition of cement modifiers | | | | | | Core/ | Weight average molecular weight (10000) | | State of spraying | Particle size (nm) |
|---|---|---|---|---|---|---|---|---|---|---|---|
| | Core section | | | Shell section | | | shell weight ratio | | | | |
| | Compositional ratio MMA/BA/MAA | Tg | Acid value | Compositional ratio MMA/BA/MMA | Tg | Acid value | | Core | Shell | | |
| Example 1 | 50/50/0 | 11 | 0 | 54/26/20 | 59 | 120 | 50/50 | 60 | 80 | ○ | 350 |
| Example 2 | 50/50/0 | 11 | 0 | 54/26/20 | 59 | 120 | 50/50 | 60 | 80 | ○ | 350 |
| Example 3 | 50/50/0 | 11 | 0 | 54/26/20 | 59 | 120 | 50/50 | 60 | 80 | ○ | 350 |
| Example 4 | 50/50/0 | 11 | 0 | 54/26/20 | 59 | 120 | 60/40 | 60 | 80 | ○ | 350 |
| Example 5 | 50/50/0 | 11 | 0 | 54/26/20 | 59 | 120 | 60/40 | 60 | 80 | ○ | 350 |
| Example 6 | 50/50/0 | 11 | 0 | 60/25/15 | 59 | 90 | 50/50 | 60 | 80 | ○ | 360 |
| Example 7 | 50/50/0 | 11 | 0 | 54/26/20 | 59 | 120 | 50/50 | 30 | 80 | ○ | 350 |
| Example 8 | 50/50/0 | 11 | 0 | 54/26/20 | 59 | 120 | 50/50 | 100 | 80 | ○ | 355 |
| Example 9 | 33/67/0 | −15 | 0 | 54/26/20 | 59 | 120 | 50/50 | 60 | 80 | ○ | 350 |
| Example 10 | 41/59/0 | 0 | 0 | 54/26/20 | 59 | 120 | 50/50 | 60 | 80 | ○ | 350 |
| Example 11 | 49/50/1 | 12 | 6 | 54/26/20 | 59 | 120 | 50/50 | 60 | 80 | ○ | 350 |
| Example 12 | 46/51/3 | 11 | 18 | 54/26/20 | 59 | 120 | 50/50 | 60 | 80 | ○ | 350 |
| Example 13 | 50/50/0 | 11 | 0 | 54/26/20 | 59 | 120 | 50/50 | 60 | 30 | ○ | 350 |
| Example 14 | 50/50/0 | 11 | 0 | 54/26/20 | 59 | 120 | 50/50 | 60 | 50 | ○ | 350 |
| Example 15 | 50/50/0 | 11 | 0 | 54/26/20 | 59 | 120 | 50/50 | 60 | 150 | ○ | 350 |
| Example 16 | 50/50/0 | 11 | 0 | 49/31/20 | 50 | 120 | 50/50 | 60 | 80 | ○ | 350 |
| Example 17 | 50/50/0 | 11 | 0 | 60/20/20 | 72 | 120 | 50/50 | 60 | 80 | ○ | 350 |
| Example 18 | 50/50/0 | 11 | 0 | 69/11/20 | 92 | 120 | 50/50 | 60 | 80 | ○ | 350 |
| Example 19 | 50/50/0 | 11 | 0 | 69/23/8 | 59 | 48 | 50/50 | 60 | 80 | ○ | 370 |
| Comparative Example 1 | 50/50/0 | 11 | 0 | 54/26/20 | 59 | 120 | 90/10 | 60 | 80 | x | 350 |
| Comparative Example 2 | 50/50/0 | 11 | 0 | 54/26/20 | 59 | 120 | 10/90 | 60 | 80 | ○ | 350 |
| Comparative Example 3 | 64/36/0 | 32 | 0 | 54/26/20 | 59 | 120 | 50/50 | 60 | 80 | ○ | 350 |
| Comparative Example 4 | 64/36/0 | 32 | 0 | 54/26/20 | 59 | 120 | 50/50 | 60 | 80 | ○ | 350 |
| Comparative Example 5 | 50/50/0 | 11 | 0 | 38/42/20 | 32 | 120 | 50/50 | 60 | 80 | x | 350 |
| Comparative Example 6 | 50/50/0 | 11 | 0 | 77/21/2 | 59 | 12 | 50/50 | 60 | 80 | ○ | 370 |
| Comparative Example 7 | 50/50/0 | 11 | 0 | 38/29/33 | 59 | 200 | 50/50 | 60 | 80 | ○ | 330 |
| Comparative Example 8 | 50/50/0 | 11 | 6 | 54/26/20 | 59 | 120 | 50/50 | 60 | 1 | ○ | 350 |
| Comparative Example 9 | 50/50/0 | 11 | 0 | 54/26/20 | 59 | 120 | 50/50 | 60 | 250 | ○ | 350 |
| Comparative Example 10 | 50/50/0 | 11 | 0 | 54/26/20 | 59 | 120 | 50/50 | 5 | 80 | ○ | 350 |
| Comparative Example 11 | 50/50/0 | 11 | 0 | 54/26/20 | 59 | 120 | 50/50 | 250 | 80 | ○ | 350 |
| Comparative Example 12 | 16/84/0 | −30 | 0 | 54/26/20 | 59 | 120 | 50/50 | 60 | 80 | x | 350 |
| Comparative Example 13 | 40/52/8 | 11 | 42 | 54/26/20 | 59 | 120 | 50/50 | 60 | 80 | ○ | 350 |
| Comparative Example 14 | 30/54/16 | 11 | 96 | 54/26/20 | 59 | 120 | 50/50 | 60 | 80 | ○ | 350 |
| Comparative Example 15 | 50/50/0 | 11 | 0 | 40/40/20 | 35 | 120 | 50/50 | 60 | 80 | x | 350 |
| Comparative Example 16 | 50/50/0 | 11 | 0 | 75/5/20 | 106 | 120 | 50/50 | 60 | 80 | ○ | 350 |
| Comparative Example 17 | 50/50/0 | 11 | 0 | 57/10/33 | 103 | 200 | 50/50 | 5 | 2 | ○ | 100 |

TABLE 1-continued (Examples for systems with no alkaline neutralization)

| | Properties of cement modifiers | | MFT (° C.) of alkaline re-dispersed solution | Properties of coated film | | Cement blend composition A | | Hardening conditions | | |
|---|---|---|---|---|---|---|---|---|---|---|
| | Anti-blocking properties | Re-dispersibility | | Water resistance | Resistance to acid | Viscosity | Surface hardness | Temperature (° C.) | W/C (%) | P/C (%) |
| Example 1 | ○ | ○ | 5 | ○ | ○ | ○ | ○ | 25 | 55 | 3 |
| Example 2 | ○ | ○ | 5 | ○ | ○ | ○ | ○ | 5 | 55 | 3 |
| Example 3 | ○ | ○ | 5 | ○ | ○ | ○ | ○ | 5 | 55 | 10 |
| Example 4 | ○ | ○ | 5 | ○ | ○ | ○ | ○ | 25 | 55 | 3 |
| Example 5 | ○ | ○ | 5 | ○ | ○ | ○ | ○ | 5 | 55 | 3 |
| Example 6 | ○ | ○ | 5 | ○ | ○ | ○ | ○ | 25 | 55 | 3 |
| Example 7 | ○ | ○ | 5 | ○ | ○ | ○ | ○ | 5 | 55 | 3 |
| Example 8 | ○ | ○ | 5 | ○ | ○ | ○ | ○ | 5 | 55 | 3 |
| Example 9 | ○Δ | ○ | 5 | ○ | ○ | ○ | ○ | 5 | 55 | 3 |
| Example 10 | ○ | ○ | 5 | ○ | ○ | ○ | ○ | 5 | 55 | 3 |
| Example 11 | ○ | ○ | 5 | ○ | ○ | ○ | ○ | 5 | 55 | 3 |
| Example 12 | ○ | ○ | 5 | ○ | ○ | ○ | ○ | 5 | 55 | 3 |
| Example 13 | ○ | ○ | 5 | ○ | ○ | ○ | ○ | 5 | 55 | 3 |
| Example 14 | ○ | ○ | 5 | ○ | ○ | ○ | ○ | 5 | 55 | 3 |
| Example 15 | ○ | ○ | 5 | ○ | ○ | ○ | ○ | 5 | 55 | 3 |
| Example 16 | ○ | ○ | 5 | ○ | ○ | ○ | ○ | 5 | 55 | 3 |
| Example 17 | ○ | ○ | 10 | ○ | ○ | ○ | ○ | 5 | 55 | 3 |
| Example 18 | ○ | ○ | 18 | ○ | ○ | ○ | ○ | 5 | 55 | 3 |
| Example 19 | ○ | ○ | 18 | ○ | ○ | ○ | ○ | 5 | 55 | 3 |
| Comparative Example 1 | x | x | — | — | — | — | — | — | — | — |
| Comparative Example 2 | ○ | ○ | ≦5 | ○ | ○ | x | ○ | 5 | 55 | 3 |
| Comparative Example 3 | ○ | ○ | 25 | ○ | ○ | ○ | ○ | 25 | 55 | 3 |
| Comparative Example 4 | ○ | ○ | 25 | ○ | ○ | ○ | x | 5 | 55 | 3 |
| Comparative Example 5 | x | x | — | — | — | — | — | — | — | — |
| Comparative Example 6 | ○ | ○ | 50 | ○ | ○ | ○ | x | 25 | 55 | 3 |
| Comparative Example 7 | ○ | ○ | ≦5 | ○ | ○ | x | ○ | 5 | 55 | 3 |
| Comparative Example 8 | ○ | ○ | ≦5 | x | x | ○ | x | 5 | 55 | 3 |
| Comparative Example 9 | ○ | ○ | 45 | ○ | ○ | x | x | 25 | 55 | 3 |
| Comparative Example 10 | ○ | ○ | ≦5 | x | Δ | ○ | x | 5 | 55 | 3 |
| Comparative Example 11 | ○ | ○ | 30 | ○ | ○ | ○ | x | 5 | 55 | 3 |
| Comparative Example 12 | x | x | — | — | — | — | — | — | — | — |
| Comparative Example 13 | ○ | ○ | ≦5 | x | ○ | Δ | ○ | 5 | 55 | 3 |
| Comparative Example 14 | ○ | ○ | ≦5 | x | ○ | x | ○ | 5 | 55 | 3 |
| Comparative Example 15 | x | x | — | — | — | — | — | — | — | — |
| Comparative Example 16 | ○ | ○ | 25 | x | x | x | x | 5 | 55 | 3 |
| Comparative Example 17 | ○ | ○ | 25 | x | x | x | x | 5 | 55 | 3 |

TABLE 2

(Examples for systems with alkaline neutralization)

| | Composition of cement modifiers | | | | | | Core/shell weight ratio | Weight average molecular weight (10000) | | Extent of neutralization (%) | State of spraying | Particle size (nm) |
|---|---|---|---|---|---|---|---|---|---|---|---|---|
| | Core section | | | Shell section | | | | | | | | |
| | Compositional ratio | | Acid value | Compositional ratio | | Acid value | | | | | | |
| | MMA/BA | Tg | | MMA/BA/MAA | Tg | | | Core | Shell | | | |
| Example 20 | 50/50 | 11 | 0 | 54/26/20 | 59 | 120 | 50/50 | 60 | 80 | 20 | ○ | 350 |
| Example 21 | 50/50 | 11 | 0 | 54/26/20 | 59 | 120 | 70/30 | 60 | 80 | 20 | ○ | 350 |
| Example 22 | 50/50 | 11 | 0 | 54/26/20 | 59 | 120 | 30/70 | 60 | 80 | 20 | ○ | 350 |
| Example 23 | 50/50 | 11 | 0 | 54/26/20 | 59 | 120 | 50/50 | 60 | 80 | 50 | ○ | 350 |
| Example 24 | 50/50 | 11 | 0 | 48/27/25 | 59 | 150 | 50/50 | 55 | 80 | 20 | ○ | 320 |
| Example 25 | 50/50 | 11 | 0 | 67/23/10 | 59 | 60 | 50/50 | 64 | 80 | 20 | ○ | 370 |
| Comparative Example 18 | 50/50 | 11 | 0 | 54/26/20 | 59 | 120 | 50/50 | 60 | 80 | 0 | ○ | 350 |
| Comparative Example 19 | 50/50 | 11 | 0 | 54/26/20 | 59 | 120 | 50/50 | 60 | 80 | 80 | ○ | 350 |
| Comparative Example 20 | 50/50 | 11 | 0 | 54/26/20 | 59 | 120 | 95/5 | 60 | 80 | 20 | x | 350 |
| Comparative Example 21 | 50/50 | 11 | 0 | 54/26/20 | 59 | 120 | 10/90 | 60 | 80 | 20 | ○ | 350 |
| Comparative Example 22 | 50/50 | 11 | 0 | 77/21/2 | 59 | 12 | 50/50 | 70 | 80 | 20 | ○ | 370 |
| Comparative Example 23 | 50/50 | 11 | 0 | 28/32/40 | 59 | 240 | 50/50 | 49 | 80 | 20 | ○ | 300 |

TABLE 2-continued (Examples for systems with alkaline neutralization)

| | | | | | | | | | | | | |
|---|---|---|---|---|---|---|---|---|---|---|---|---|
| Comparative Example 24 | 50/50 | 11 | 0 | 44/36/20 | 40 | 120 | 50/50 | 60 | 80 | 20 | Δ | 350 |
| Comparative Example 25 | 50/50 | 11 | 0 | 54/26/20 | 59 | 120 | 50/50 | 60 | 3 | 20 | ○ | 350 |
| Comparative Example 26 | *1 | −45 | 0 | 54/26/20 | 59 | 120 | 50/50 | 60 | 80 | 20 | x | 350 |
| Comparative Example 27 | 66/34 | 36 | 0 | 54/26/20 | 59 | 120 | 50/50 | 60 | 80 | 20 | ○ | 350 |
| Comparative Example 28 | *2 | 11 | 60 | 54/26/20 | 59 | 120 | 50/50 | 60 | 80 | 20 | ○ | 350 |
| Reference Example 1 | | | | | | No cement modifier | | | | | | |

| | Properties of cement modifiers | | MFT (° C.) of alkaline re- | Wa- ter | Cement blend composition B | | | | Cement blend composition A | | | |
|---|---|---|---|---|---|---|---|---|---|---|---|---|
| | | | | | | | | | Visc- osity | Strength (25° C.) | | Strength (5° C.) | |
| | Anti- blocking properties | Re- dispers- ibility | dispersed solution | resis- tance | Tro- wel- abi- lity | Flex- ural | Compre- ssion | Adh- esion | | Flex- ural | Compre- ssion | Flex- ural | Compre- ssion |
| Example 20 | ○ | ○ | ≦5 | ○ | ○ | ○ | ○ | ○ | ○ | ○ | ○ | ○ | ○ |
| Example 21 | ○ | ○ | ≦5 | ○ | ○ | ○ | ○ | ○ | ○ | ○ | ○ | ○ | ○ |
| Example 22 | ○ | ○ | ≦5 | ○ | ○ | ○ | ○ | ○ | ○ | ○ | ○ | ○ | ○ |
| Example 23 | ○ | ○ | ≦5 | ○ | ○ | ○ | ○ | ○ | ○ | ○ | ○ | ○ | ○ |
| Example 24 | ○ | ○ | ≦5 | ○ | ○ | ○ | ○ | ○ | ○ | ○ | ○ | ○ | ○ |
| Example 25 | ○ | ○ | 12 | ○ | ○ | ○ | ○ | ○ | ○ | ○ | ○ | ○ | ○ |
| Comparative Example 18 | Δ | Δ | ≦5 | ○ | x | ○ | ○ | x | Δ | ○ | ○ | ○ | ○ |
| Comparative Example 19 | ○ | Δ | ≦5 | ○ | ○ | Δ | Δ | ○ | ○ | Δ | Δ | Δ | Δ |
| Comparative Example 20 | x | x | — | — | — | — | — | — | — | — | — | — | — |
| Comparative Example 21 | ○ | Δ | ≦5 | Δ | ○ | ○ | ○ | ○ | x | Δ | Δ | Δ | Δ |
| Comparative Example 22 | Δ | Δ | 40 | ○ | Δ | Δ | Δ | x | ○ | Δ | Δ | x | x |
| Comparative Example 23 | Δ | Δ | ≦5 | Δ | ○ | ○ | ○ | ○ | x | Δ | Δ | Δ | Δ |
| Comparative Example 24 | x | x | — | — | — | — | — | — | — | — | — | — | — |
| Comparative Example 25 | ○ | ○ | ≦5 | x | ○ | ○ | ○ | ○ | ○ | ○ | ○ | Δ | Δ |
| Comparative Example 26 | x | x | — | — | — | — | — | — | — | — | — | — | — |
| Comparative Example 27 | ○ | ○ | 30 | ○ | ○ | Δ | Δ | Δ | ○ | Δ | Δ | x | x |
| Comparative Example 28 | ○ | Δ | ≦5 | ○ | ○ | ○ | ○ | ○ | x | ○ | ○ | ○ | ○ |
| Reference Example 1 | No cement modifier | | | | x | ○ | ○ | Δ | ○ | Δ | Δ | x | x |

*1: BA = 100
*2: MMA/BA/MAA = 38/52/10
The symbols in the tables are as given below;
MMA: methyl methacrylate
BA: butyl acrylate
MAA: mathacrylic acid
W/C: water/cementitious material × 100%
P/C: powdery material/cementitious material × 100%

What is claimed is:

1. An acrylic polymer powdery material comprising fine particles of a core-shell structure formed of: (i) a core polymer containing an acrylic polymer having a glass transition temperature (Tg) of −20−+15° C., a weight average molecular weight of 100000−2000000, an acid value of 25 mg KOH/g or less; and (ii) a shell polymer containing an acrylic polymer having a Tg of 50−90° C., a weight average molecular weight of 100000−2000000, an acid value of 30−130 mg KOH/g, wherein the weight ratio of the core polymer of the shell polymer is 30/70−80/20 (% by weight), the powdery material being free-flowing and devoid of any secondary aggregated powder crumbs of 1 mm or greater in diameter.

2. A powdery material as set forth in claim 1, wherein a volume average particle size of primary particles being within the range of 200−700 nm, the primary particles comprising a shell polymer having a glass transition temperature (Tg) 55−80° C. and having a weight average molecular weight of 300000−1.3 million.

3. A powdery material as set forth in claim 1 or claim 2, wherein the powdery material has a friability of not less than 50% according to a blocking test of the acrylic polymer powdery material conducted under the following conditions: 20 g of sample is packed into a cylinder with a 54 mm diameter, to which sample is applied a 5 kg weight which is left standing for 2 hours at 50° C. to produce a blocked product; then the blocked product is placed on a sieve with 1 mm mesh-opening and it is electromagnetically vibrated to crumble for 20 seconds, the amount of the sample falling through the sieve is measured and the friability is determined by the following formula $$\text{Sample's friability \%} = \frac{\text{The amount of sample crumbled and falling through the sieve (g)}}{\text{The total amount of sample placed on the sieve (20 g)}} \times 100.$$

4. An emulsion obtained by dispersing the fine particles of a core-shell structure of claim 1 or claim 2 in a aqueous alkali solution at a 10% by weight solids content, which emulsion has a minimum film forming temperature of 20° C. or lower.

5. A powdery material as set forth in claim 1 or claim 2, wherein 5−70% of the total amount of carboxylic acids contained in the fine particles of a core-shell structure in has been neutralized.

6. A powdery material as set forth in claim 5 in which 20−60% of the total amount of carboxylic acid is neutralized.

7. A powdery material as set forth in claim 1 or claim 2, wherein the powdery material is obtained by spray drying an emulsion containing the fine particles of a core-shell structure.

8. A powdery material as set forth in claim 1, wherein the powdery material is obtained by spray drying an emulsion containing the fine particles of a polymerized core-shell structure obtained by emulsion polymerization.

9. A powdery material as set forth in claim 1 or claim 2 in which the fine particles of the core-shell structure formed of a core polymer and a shell polymer are formed by polymerization from monomer mixtures having the following compositions:

wherein the core-polymer-forming monomer contains,
(a-1) 90–100% by weight of at least one vinyl monomer selected from alkyl (meth) acrylates, styrene, vinyl chloride, and vinyl acetate and
(a-2) 0–10% by weight of one other copolymerizable monomer; and wherein the shell-polymer forming monomer contains,
(b-1) 70–95% by weight of at least one vinyl monomer selected from alkyl (meth)acrylate, styrene, vinyl chloride, and vinyl acetate,
(b-2) 5–30% by weight of an unsaturated carboxylic acid, and
(b-3) 0–10% by weight of one other copolymerizable monomer.

10. A powdery material as set forth in claim 2 in which the fine particles of a core-shell structure are obtained by a first polymerization stage of obtaining a core polymer from a core-polymer-forming monomer by emulsion polymerization and a second polymerization stage of obtaining a shell polymer from a shell polymer forming monomer by emulsion polymerization.

11. a powdery material as set forth in claim 9 in which the core polymer is a polymer having a composition containing 20–70% by weight of methyl methacrylate, 0–10% by weight of butyl methacrylate and/or ethyl methacrylate, 30–70% by weight of butyl acrylate and/or ethyl acrylate and the shell polymer contains 35–80% by weight of methyl methacrylate, 10–40% by weight of butyl acrylate and/or ethyl acrylate, and 10–25% by weight of methacrylic acid.

12. A powdery material as set forth in claim 4 in which the minimum film forming temperature is 5° C. or less.

13. A powdery material as set forth in claim 7 in which the emulsion contains no anti-blocking agent.

14. A powdery material as set forth in claim 3 in which the friability is not less than 50%.

15. A powdery material as set forth in claim 3 in which the friability is about 80%.

16. A modifier for cementitious material wherein an effective amount of a powdery acrylic polymer material as set forth in claim 1 or 2 is mixed therewith.

* * * * *